United States Patent
Yang et al.

(10) Patent No.: US 10,027,444 B2
(45) Date of Patent: Jul. 17, 2018

(54) METHOD AND DEVICE FOR RESPONSE INFORMATION TRANSMISSION, TERMINAL, BASE STATION AND STORAGE MEDIUM

(71) Applicant: ZTE Corporation, Shenzhen (CN)

(72) Inventors: Weiwei Yang, Shenzhen (CN); Bo Dai, Shenzhen (CN); Chunli Liang, Shenzhen (CN); Shuqiang Xia, Shenzhen (CN); Huiying Fang, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 0 days.

(21) Appl. No.: 15/109,082

(22) PCT Filed: Aug. 12, 2014

(86) PCT No.: PCT/CN2014/084191
§ 371 (c)(1),
(2) Date: Jun. 29, 2016

(87) PCT Pub. No.: WO2015/101046
PCT Pub. Date: Jul. 9, 2015

(65) Prior Publication Data
US 2016/0329994 A1    Nov. 10, 2016

(30) Foreign Application Priority Data

Jan. 3, 2014 (CN) .......................... 2014 1 0003701

(51) Int. Cl.
*H04L 1/18* (2006.01)
*H04L 1/00* (2006.01)
*H04L 5/00* (2006.01)

(52) U.S. Cl.
CPC .......... *H04L 1/1854* (2013.01); *H04L 1/0055* (2013.01); *H04L 1/1812* (2013.01); *H04L 1/1861* (2013.01); *H04L 5/0055* (2013.01)

(58) Field of Classification Search
CPC ...................................................... H04L 1/1854
See application file for complete search history.

(56) References Cited

U.S. PATENT DOCUMENTS 8,599,760 B2    12/2013    Roh
2011/0274023 A1    11/2011    Roh
(Continued)

FOREIGN PATENT DOCUMENTS

| CN | 101594211 A | 12/2009 |
| CN | 103312470 A | 9/2013 |
| WO | 2012109195 A2 | 8/2012 |
| WO | 2013125860 A1 | 8/2013 |

OTHER PUBLICATIONS

International Search Report in international application No. PCT/CN2014/084191, dated Sep. 30, 2014.
(Continued)

*Primary Examiner* — John Blanton
(74) *Attorney, Agent, or Firm* — Oppedahl Patent Law Firm LLC

(57) ABSTRACT

Disclosed are a method and device for response information transmission, a terminal, a base station and a storage medium. The method for response information transmission includes: when a time division duplex serving cell and a frequency division duplex serving cell are performing carrier aggregation and are configured to employ a physical uplink control channel (PUCCH) format 1b with channel selection mode for transmission of hybrid automatic repeat request-acknowledgement (HARQ-ACK) response information, determining HARQ-ACK response information transmitted on an uplink subframe by a first serving cell and
(Continued)

a second serving cell, and transmitting the determined HARQ-ACK response information via a PUCCH or a physical uplink shared channel (PUSCH).

18 Claims, 3 Drawing Sheets

(56) References Cited

U.S. PATENT DOCUMENTS

| | | |
|---|---|---|
| 2012/0099491 A1 | 4/2012 | Lee |
| 2013/0322357 A1* | 12/2013 | He .................... H04W 72/0406 370/329 |
| 2013/0322358 A1 | 12/2013 | He |
| 2014/0161002 A1 | 6/2014 | Gauvreau |
| 2015/0146643 A1* | 5/2015 | Fu ......................... H04L 1/1607 370/329 |
| 2016/0021655 A1 | 1/2016 | Seo et al. |
| 2016/0337090 A1 | 11/2016 | Gauvreau et al. |

OTHER PUBLICATIONS

English Translation of the Written Opinion of the International Search Authority in international application No. PCT/CN2014/084191, dated Sep. 30, 2014.

Supplementary European Search Report in European application No. 14876436.8, dated Dec. 6, 2016.

* cited by examiner

METHOD AND DEVICE FOR RESPONSE INFORMATION TRANSMISSION, TERMINAL, BASE STATION AND STORAGE MEDIUM

TECHNICAL FIELD

The disclosure relates to technology for response information transmission, and in particular to, a method and device for response information transmission, User Equipment (UE), a base station and a storage medium.

BACKGROUND

Radio frames in a Long Term Evolution (LTE) system and an LTE-Advanced (LTE-A) system have frame structures in a Frequency Division Duplex (FDD) mode and a Time Division Duplex (TDD) mode. FIG. 1 is a diagram of a frame structure in an existing LTE/LTE-A FDD system. A 10 ms radio frame consists of 20 time slots each of which is 0.5 ms long and numbered as 0~19, and the time slots 2i and 2i+1 form a subframe with a length of 1 ms. FIG. 2 is a diagram of a frame structure in an existing LTE/LTE-A TDD system. As shown in FIG. 2, a 10 ms radio frame consists of two half frames with each having a length of 5 ms. Each half frame includes 5 subframes with each having a length of 1 ms, and the subframe i is defined to include two time slots 2i and 2i+1 with each having a length of 0.5 ms. An Uplink (UL) and Downlink (DL) configuration supported in a TDD system is shown in Table 1:

TABLE 1

| UL-DL configuration | UL-DL switch period | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

For each subframe in a radio frame, "D" represents a subframe dedicated to DL transmission, "U" represents a subframe dedicated to UL transmission, and "S" represents a special subframe, including three parts, i.e. a Downlink Pilot Time Slot (DwPTS), a Guard Period (GP) and an Uplink Pilot Time Slot (UpPTS).

The TDD supports the periods of 5 ms and 10 ms for switching between UL and DL. If the DL-to-UL switch period is 5 ms, both of two half frames include the special subframe. If the DL-to-UL switch period is 10 ms, only the first half frame includes the special subframe. Subframe 0, subframe 5 and the DwPTS are always configured for DL transmission. An UpPTS and the subframe following the special subframe are dedicated to UL transmission.

In DL Hybrid Automatic Repeat Request (HARQ) of an LTE system, when UE does not use a Physical Uplink Shared Channel (PUSCH) for transmission, HARQ-ACK information from a Physical Downlink Shared Channel (PDSCH) is transmitted on a Physical Uplink Control Channel (PUCCH); otherwise, the HARQ-ACK information is transmitted on the PUSCH.

In an LTE TDD system, transmission of HARQ-ACK information from a PDSCH in DL HARQ is required to follow the following timing specification, that is, a DL HARQ timing is required to follow the following specification: when UE detects transmission from a PDSCH or a PDCCH indicating DL Semi-Persistent Scheduling (SPS) release on subframe n-k, the UE transmits corresponding HARQ-ACK information on subframe n, wherein k belongs to K, M is the total number of K, a maximum value of M is 4, and values of K in different UL-DL configurations are shown in Table 2:

TABLE 2

| UL-DL configuration | Subframe number n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

In an LTE TDD system, there are two methods for transmitting an HARQ-ACK message. One is bundling, of which a core idea is that logical AND operation is performed on HARQ-ACK messages, required to be fed back on a UL subframe, of transport blocks corresponding to each DL subframe. UE is required to feed back a 2-bit HARQ-ACK message if each DL subframe has two transport blocks and the UE is required to feed back a 1-bit HARQ-ACK message if each subframe has only one transport block. The other method is multiplexing. In the LTE, the method mainly refers to PUCCH format 1b with channel selection, a core idea of which is that different PUCCHs and different modulated symbols on the channels are utilized to represent different feedback states of DL subframes, required to be fed back on a UL subframe. If there are multiple transport blocks on the DL subframes, channel selection is performed after spatial logical AND operation (also called space-domain bundling) for HARQ-ACKs fed back by the multiple transport blocks of the DL subframes, and then PUCCH format 1b is adopted for transmission.

Compared with an LTE system, the most significant characteristic of an LTE-A system is that a Carrier Aggregation (CA) technology is introduced, that is, bandwidths of the LTE system are aggregated to obtain a greater bandwidth. In a system into which the CA is introduced, a carrier to be aggregated is called a Component Carrier (CC), and is also called a serving cell. In addition, concepts of Primary Component Carrier/Cell (PCC/PCell) and Secondary Component Carrier/Cell (SCC/SCell) are further introduced. A system into which the CA is introduced at least includes a primary serving cell and a secondary serving cell, wherein the primary serving cell is in an active state all the time. The TDD system only supports, in Rel-10, aggregation of serving cells with the same UL-DL configuration.

In an LTE-A CA system, when a base station configures multiple DL serving cells for UE, the UE is required to feed back HARQ-ACK messages of corresponding code streams of the multiple DL serving cells. In the LTE-A system, when an HARQ-ACK message is transmitted on a PUCCH, two transmission manners are defined: a transmission manner of PUCCH format 1b with channel selection and a Discrete Fourier Transform Spread Orthogonal Frequency Division Multiplexing (DFT-s-OFDM)-based transmission manner. Since the DFT-s-OFDM-based transmission manner and its channel structure are different from those of PUCCH format 1/1a/1b/2/2a/2b, such a structure is called PUCCH format 3 in an existing LTE-A protocol. For UE configured with multiple serving cells, if the UE may support aggregation of at most two serving cells, the UE may transmit an HARQ-ACK in a manner of PUCCH format 1b with channel selection; and if the UE may support aggregation of more than two serving cells, the base station may further use high-layer signalling to configure whether the UE transmits HARQ-ACK information in the manner of PUCCH format 1b with channel selection or PUCCH format 3.

In an LTE-A TDD system, when two serving cells are configured, a manner of format 1b with channel selection is adopted to transmit HARQ-ACK information and the number M of corresponding DL subframes is 1, the transmitted HARQ-ACK information is Acknowledgement/Negative Acknowledgement/Discontinuous Transmission (ACK/NACK/DTX) feedback to a transport block of each serving cell or a PDCCH indicating SPS release. When two serving cells are configured, the manner of format 1b with channel selection is adopted to transmit the HARQ-ACK information and the number M of the corresponding DL subframes is 2, the HARQ-ACK information is an ACK/NACK/DTX response to a PDSCH of each serving cell or the PDCCH indicating SPS release. That is, if the PDSCH corresponds to two transport blocks, the HARQ-ACK information from the PDSCH is obtained by space-domain bundling HARQ-ACK information from the two transport blocks. When two serving cells are configured, the manner of format 1b with channel selection is adopted to transmit the HARQ-ACK information and the number M of the corresponding DL subframes is $2 < M \leq 4$, the HARQ-ACK information fed back by each serving cell has at most 2 bits, and is obtained by sequentially performing space-domain bundling and time-domain bundling on ACK/NACK/DTX responses from all the transport blocks of each serving cell. In a current protocol release, when two serving cells are configured, a manner of format 1b with channel selection is adopted to transmit HARQ-ACK information and the number M of corresponding DL subframes is 3 or 4, space-domain bundling and time-domain bundling are sequentially performed on ACK/NACK/DTX responses from all transport blocks of each serving cell to obtain 2-bit HARQ-ACK information of each serving cell. Transmission of the obtained HARQ-ACK information on a PUCCH or a PUSCH is implemented in the following manner.

If the HARQ-ACK information is to be transmitted on the PUCCH, PUCCH resources and transmission subframes are found in a corresponding mapping table according to the ACKs/NACKs/DTX obtained by performing space-domain bundling on the ACKs/NACKs from all the transport blocks of the serving cells, and then the HARQ-ACK information is transmitted. The mapping table is shown in Table 2 and Table 3.

If the HARQ-ACK information is to be transmitted on the PUSCH and there is no corresponding UL grant, coded input bits o(0),o(1),o(2),o(3) for transmission are found from a corresponding mapping table according to the ACKs/NACKs/DTX obtained by performing space-domain bundling on the ACKs/NACKs from all the transport blocks of the serving cells, and then the HARQ-ACK information is transmitted.

TABLE 3

| UL-DL configuration of a TDD serving cell | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6, 5, 4 | — | 5, 4 | — | — | 6, 5, 4 | — | 5, 4 |
| 1 | — | — | 7, 6, 5 | 5, 4 | — | — | — | 7, 6, 5 | 5, 4 | — |
| 2 | — | — | 8, 7, 5, 4, 6 | — | — | — | — | 8, 7, 5, 4, 6 | — | — |
| 3 | — | — | 10, 9, 8, 11 | 8, 7, 6 | 6, 5, 4 | — | — | — | — | — |
| 4 | — | — | 12, 10, 9, 8, 11 | 8, 6, 5, 4, 7 | — | — | — | — | — | — |
| 5 | — | — | 13, 12, 10, 9, 8, 7, 5, 4, 11, 6 | — | — | — | — | — | — | — |
| 6 | — | — | 8, 7 | 6, 7 | 6, 5 | — | — | 7, 6 | 5, 4 | — |

When UE detects PDSCH transmission of an FDD secondary serving cell or a PDCCH indicating DL SPS release on subframe n-k, the UE transmits HARQ-ACK information on UL subframe n of a TDD primary serving cell, wherein k belongs to K, and when the primary serving cell has different UL-DL configurations, specific values of K are shown in Table 4:

TABLE 4

| UL-DL configuration of TDD serving cell | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6, 5, 4 | — | 5, 4 | — | — | 6, 5, 4 | — | 5, 4 |
| 1 | — | — | 7, 6, 5 | 5, 4 | — | — | — | 7, 6, 5 | 5, 4 | — |
| 2 | — | — | 8, 7, 5, 4, 6 | — | — | — | — | 8, 7, 5, 4, 6 | — | — |
| 3 | — | — | 10, 9, 8, 7, 6, 11 | 6, 5 | 5, 4 | — | — | — | — | — |
| 4 | — | — | 12, 10, 9, 8, 7, 11 | 6, 5, 4, 7 | — | — | — | — | — | — |
| 5 | — | — | 13, 12, 10, 9, 8, 7, 5, 4, 11, 6 | — | — | — | — | — | — | — |
| 6 | — | — | 7 | 5, 6, 7 | 5 | — | — | 7 | 7, 6, 5, 4 | — |

As can be seen from Table 3 and Table 4, a value of M is at least 4 when the primary serving cell adopts TDD UL-DL configurations #2, #3 and #4, while the existing PUCCH format 1b with channel selection is only suitable for M=4. Thus, the PUCCH format 1b with channel selection cannot be used to transmit an HARQ-ACK in TDD-FDD CA.

SUMMARY

In view of the above, the disclosure provides a method and device for response information transmission, User Equipment (UE), and a base station, which may implement transmission of HARQ-ACK information with PUCCH format 1b with channel selection in TDD-FDD CA.

The technical solutions of the disclosure are implemented as follows.

A method for response information transmission is provided, which may include:

when a TDD serving cell and an FDD serving cell perform CA and it is configured that a manner of PUCCH format 1b with channel selection is adopted to transmit HARQ-ACK information, HARQ-ACK information transmitted by a first serving cell and a second serving cell on a UL subframe is determined in one of the following three manners, and the determined HARQ-ACK information is transmitted through a PUCCH or a PUSCH:

Manner 1: selecting N Downlink (DL) subframes from M DL subframes $\{n-k_0, n-k_1, \ldots, n-k_{M-1}\}$ of the first serving cell, corresponding to the UL subframe, according to one or more of predefined rules A, bundling ACKs/Negative Acknowledgements (NACKs) of the N selected DL subframes, determining the HARQ-ACK information required to be transmitted by the first serving cell according to the bundled ACKs/NACKs and ACKs/NACKs corresponding to the remaining DL subframes, and determining the HARQ-ACK information required to be transmitted by the second serving cell according to ACKs/NACKs of X DL subframes $\{n-k_0^P, n-k_1^P, \ldots, n-k_{X-1}^P\}$ of the second serving cell, corresponding to the UL subframe;

Manner 2: selecting Q DL subframes from the M DL subframes $\{n-k_0, n-k_1, \ldots, n-k_{M-1}\}$ of the first serving cell, corresponding to the UL subframe, according to one or more of predefined rules B, determining the HARQ-ACK information required to be transmitted by the first serving cell according to ACKs/NACKs corresponding to M−Q DL subframes, and determining the HARQ-ACK information required to be transmitted by the second serving cell according to ACKs/NACKs corresponding to X+Q DL subframes; and Manner 3: selecting Q DL subframes from the M DL subframes $\{n-k_0, n-k_1, \ldots, n-k_{M-1}\}$ of the first serving cell, corresponding to the UL subframe, according to one or more of predefined rules B, selecting N DL subframes from M−Q DL subframes of the first serving cell according to one or more of predefined rules A if M−Q>4, bundling ACKs/NACKs corresponding to the N selected DL subframes, and determining the HARQ-ACK information required to be transmitted by the first serving cell according to the bundled ACKs/NACKs and ACKs/NACKs corresponding to the remaining DL subframes, and if M−Q≤4, determining the HARQ-ACK information required to be transmitted by the first serving cell according to ACKs/NACKs corresponding to M−Q DL subframes; if X+Q>4, selecting N DL subframes from X+Q DL subframes of the second serving cell according to one or more of predefined rules A, bundling ACKs/NACKs corresponding to the N selected DL subframes, and determining the HARQ-ACK information required to be transmitted by the second serving cell on the UL subframe according to the bundled ACKs/NACKs and the ACKs/NACKs corresponding to the remaining DL subframes, and if X+Q≤4, determining the HARQ-ACK information required to be transmitted by the second serving cell according to ACKs/NACKs corresponding to the X+Q DL subframes, wherein M is a positive integer more than 4.

A device for response information transmission, including: a determination unit and a transmission unit, wherein the determination unit is configured to, when a Time Division Duplex (TDD) serving cell and a Frequency Division Duplex (FDD) serving cell perform Carrier Aggregation (CA) and it is configured to use a Physical Uplink Control Channel (PUCCH) format 1b with channel selection to transmit Hybrid Automatic Repeat Request-ACK (HARQ-ACK) information, determine HARQ-ACK information to be transmitted on an Uplink (UL) subframe by a first serving cell and a second serving cell in one of the following three manners:

Manner 1: selecting N Downlink (DL) subframes from M DL subframes $\{n-k_0, n-k_1, \ldots, n-k_{M-1}\}$ of the first serving cell, corresponding to UL subframes, according to one or more of predefined rules A, bundling ACKs/Negative Acknowledgements (NACKs) of the N selected DL subframes, determining the HARQ-ACK information required to be transmitted by the first serving cell according to the bundled ACKs/NACKs and ACKs/NACKs corresponding to the remaining DL subframes, and determining the HARQ-ACK information required to be transmitted by the second serving cell according to ACKs/NACKs of X DL subframes $\{n-k_0^P, n-k_1^P, \ldots, n-k_{X-1}^P\}$ of the second serving cell, corresponding to the UL subframe;

Manner 2: selecting Q DL subframes from the M DL subframes $\{n-k_0, n-k_1, \ldots, n-k_{M-1}\}$ of the first serving cell, corresponding to the UL subframe, according to one or more of predefined rules B, determining the HARQ-ACK information required to be transmitted by the first serving cell according to ACKs/NACKs corresponding to M−Q DL subframes, and determining the HARQ-ACK information required to be transmitted by the second serving cell according to ACKs/NACKs corresponding to X+Q DL subframes; and Manner 3: selecting Q DL subframes from the M DL subframes $\{n-k_0, n-k_1, \ldots, n-k_{M-1}\}$ of the first serving cell, corresponding to the UL subframe, according to one or more of predefined rules B, selecting N DL subframes from M−Q DL subframes of the first serving cell according to one or more of predefined rules A if M−Q>4, bundling ACKs/NACKs corresponding to the N selected DL subframes, and determining the HARQ-ACK information required to be transmitted by the first serving cell according to the bundled ACKs/NACKs and ACKs/NACKs corresponding to the remaining DL subframes, and if M−Q≤4, determining the HARQ-ACK information required to be transmitted by the first serving cell according to ACKs/NACKs corresponding to M−Q DL subframes; if X+Q>4, selecting N DL subframes from X+Q DL subframes of the second serving cell according to one or more of predefined rules A, bundling ACKs/NACKs corresponding to the N selected DL subframes, and determining the HARQ-ACK information required to be transmitted by the second serving cell on the UL subframe according to the bundled ACKs/NACKs and the remaining DL subframes, and if X+Q≤4 determining the HARQ-ACK information required to be transmitted by the second serving cell according to ACKs/NACKs corresponding to the X+Q DL subframes, wherein M is a positive integer more than 4; and the transmission unit is configured to transmit the determined HARQ-ACK information via a PUCCH or a Physical Uplink Shared Channel (PUSCH).

UE is provided, which includes the abovementioned device for response information transmission.

A base station is provided to be configured to receive response information transmitted by the abovementioned device for response information transmission.

A storage medium is provided, having a computer program stored, the computer program being configured to execute the abovementioned method for response information transmission.

According to the embodiments of the disclosure, when a Time Division Duplex (TDD) serving cell and a Frequency Division Duplex (FDD) serving cell perform Carrier Aggregation (CA) and it is configured to use a Physical Uplink Control Channel (PUCCH) format 1b with channel selection for transmission of Hybrid Automatic Repeat Request-Acknowledgement (HARQ-ACK) information, HARQ-ACK information to be transmitted on an Uplink (UL) subframe by a first serving cell and a second serving cell is determined in one of the following three manners, and the determined HARQ-ACK information is transmitted via a PUCCH or a Physical Uplink Shared Channel (PUSCH): manner 1: selecting N Downlink (DL) subframes from M DL subframes $\{n-k_0, n-k_1, \ldots, n-k_{M-1}\}$ of the first serving cell corresponding to UL subframes according to one or more of predefined rules A, bundling ACKs/Negative Acknowledgements (NACKs) corresponding to the N selected DL subframes, determining the HARQ-ACK information required to be transmitted by the first serving cell according to the bundled ACKs/NACKs and ACKs/NACKs corresponding to the remaining DL subframes, and determining the HARQ-ACK information required to be transmitted by the second serving cell according to ACKs/NACKs of X DL subframes $\{n-k_0^P, n-k_1^P, \ldots, n-k_{X-1}^P\}$ corresponding to the UL subframes of the second serving cell, wherein M>4; manner 2: selecting Q DL subframes from the M DL subframes $\{n-k_0, n-k_1, \ldots, n-k_{M-1}\}$ of the first serving cell, corresponding to the UL subframe, according to one or more of predefined rules B, determining the HARQ-ACK information required to be transmitted by the first serving cell according to ACKs/NACKs corresponding to M−Q DL subframes, and determining the HARQ-ACK information required to be transmitted by the second serving cell according to ACKs/NACKs corresponding to X+Q DL subframes, wherein M>4; manner 3: selecting Q DL subframes from the M DL subframes $\{n-k_0, n-k_1, \ldots, n-k_{M-1}\}$ of the first serving cell, corresponding to the UL subframe, according to one or more of predefined rules B, selecting N DL subframes from M−Q DL subframes of the first serving cell according to one or more of predefined rules A if M−Q is more than 4, bundling ACKs/NACKs corresponding to the N selected DL subframes, and determining the HARQ-ACK information required to be transmitted by the first serving cell according to the bundled ACKs/NACKs and ACKs/NACKs corresponding to the remaining DL subframes, and if M−Q is less than or equal to 4, determining the HARQ-ACK information required to be transmitted by the first serving cell according to ACKs/NACKs corresponding to M−Q DL subframes; if X+Q is more than 4, selecting N DL subframes from X+Q DL subframes of the second serving cell according to one or more of predefined rules A, bundling ACKs/NACKs corresponding to the N selected DL subframes, and determining the HARQ-ACK information required to be transmitted by the second serving cell on the UL subframe according to the bundled ACKs/NACKs and the ACKs/NACKs corresponding to the remaining DL subframes, and if X+Q is less than or equal to 4, determining the HARQ-ACK information required to be transmitted by the second serving cell according to ACKs/NACKs corresponding to the X+Q DL subframes, wherein M>4. By the technical solutions of the embodiments of the disclosure, transmission of the HARQ-ACK information with PUCCH format 1b with channel selection during TDD-FDD CA may be implemented.

DETAILED DESCRIPTION

Figure 1:
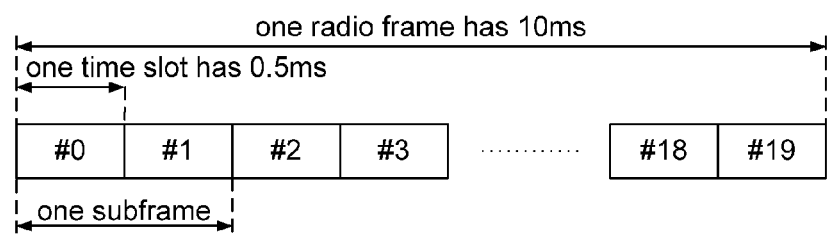
FIG. 1 is a diagram of a frame structure in an FDD system.
Figure 2:
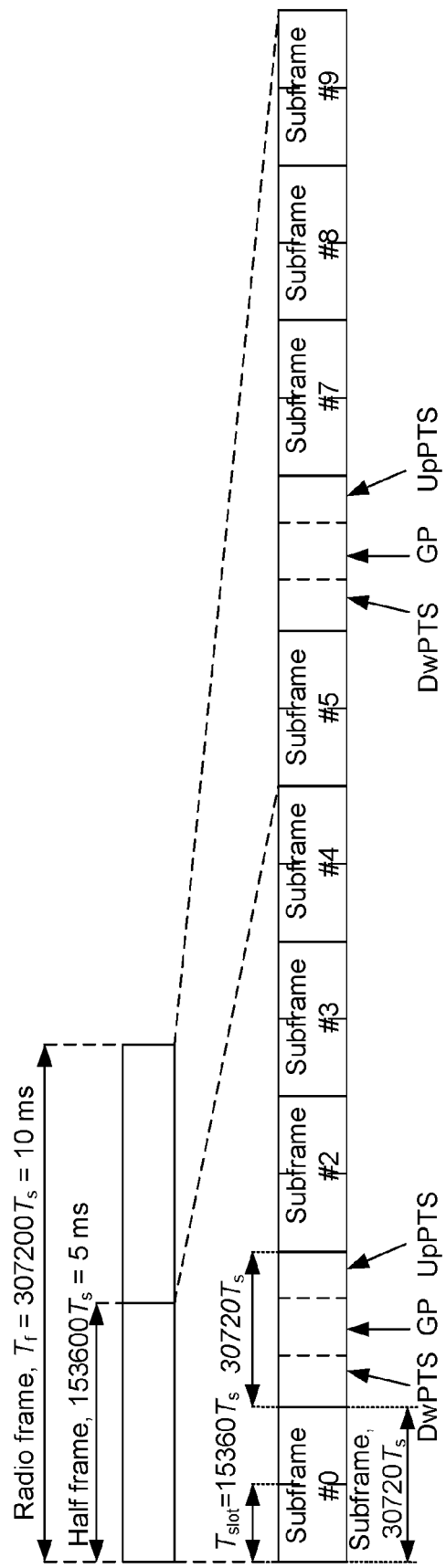
FIG. 2 is a diagram of a frame structure in a TDD system.

In order to make the purpose, technical solutions and advantages of the disclosure clearer, the disclosure will be further described below in combination with examples and with reference to the drawings in detail.

The method for response information transmission provided by the embodiments of the disclosure includes the following steps:

when a TDD serving cell and an FDD serving cell perform CA and it is configured to use a PUCCH format 1b with channel selection for transmission of HARQ-ACK information, determining HARQ-ACK information to be transmitted on an Uplink (UL) subframe by a first serving cell and a second serving cell in one of the following three manners, and transmitting the determined HARQ-ACK information via a PUCCH or a PUSCH:

Manner 1: selecting N Downlink (DL) subframes from M DL subframes $\{n-k_0, n-k_1, \ldots, n-k_{M-1}\}$ of the first serving cell, corresponding to UL subframes, according to one or more of predefined rules A, bundling ACKs/Negative Acknowledgements (NACKs) of the N selected DL subframes, determining the HARQ-ACK information required to be transmitted by the first serving cell according to the bundled ACKs/NACKs and ACKs/NACKs corresponding to the remaining DL subframes, and determining the HARQ-ACK information required to be transmitted by the second serving cell according to ACKs/NACKs of X DL subframes $\{n-k_0^P, n-k_1^P, \ldots, n-k_{X-1}^P\}$ of the second serving cell, corresponding to the UL subframe;

Manner 2: selecting Q DL subframes from the M DL subframes $\{n-k_0, n-k_1, \ldots, n-k_{M-1}\}$ of the first serving cell, corresponding to the UL subframe, according to one or more of predefined rules B, determining the HARQ-ACK information required to be transmitted by the first serving cell according to ACKs/NACKs corresponding to M−Q DL subframes, and determining the HARQ-ACK information required to be transmitted by the second serving cell according to ACKs/NACKs corresponding to X+Q DL subframes; and Manner 3: selecting Q DL subframes from the M DL subframes $\{n-k_0, n-k_1, \ldots, n-k_{M-1}\}$ of the first serving cell, corresponding to the UL subframe, according to one or more of predefined rules B, selecting N DL subframes from M−Q DL subframes of the first serving cell according to one or more of predefined rules A if M−Q>4, bundling ACKs/NACKs corresponding to the N selected DL subframes, and determining the HARQ-ACK information required to be transmitted by the first serving cell according to the bundled ACKs/NACKs and ACKs/NACKs corresponding to the remaining DL subframes, and if M−Q≤4, determining the HARQ-ACK information required to be transmitted by the first serving cell according to ACKs/NACKs corresponding to M−Q DL subframes; if X+Q>4, selecting N DL subframes from X+Q DL subframes of the second serving cell according to one or more of predefined rules A, bundling ACKs/NACKs corresponding to the N selected DL subframes, and determining the HARQ-ACK information required to be transmitted by the second serving cell on the UL subframe according to the bundled ACKs/NACKs and the remaining DL subframes, and if X+Q≤4, determining the HARQ-ACK information required to be transmitted by the second serving cell according to ACKs/NACKs corresponding to the X+Q DL subframes.

Preferably, M is more than 4.

Preferably, a value of N is determined to make the total number of the bundled ACKs/NACKs and the ACKs/NACKs corresponding to the remaining DL subframes equal to the number of the ACKs/NACKs corresponding to the DL subframes of the second serving cell; for Manner 1, M−N+1=X; for Manner 3, M−Q−N+1=X+Q−N+1 when M−Q is more than 4 and X+Q is more than 4, M−Q−N+1=X+Q when M−Q is more than 4 and X+Q is less than or equal to 4, M−Q=X+Q when M−Q is less than or equal to 4 and X+Q is less than or equal to 4, and M−Q=X+Q−N+1 when M−Q is less than or equal to 4 and X+Q is more than 4; or, the value of N is determined to make the total number of the bundled ACKs/NACKs and the ACKs/NACKs corresponding to the remaining DL subframes equal to 4; for Manner 1, M−N+1=4; and for Manner 3, M−Q−N+1=4 when M−Q is more than 4, and M−Q=4 when M−Q is less than or equal to 4.

Preferably, the step of selecting the N DL subframes from the DL subframes $\{n-k_0, n-k_1, \ldots, n-k_{M-1}\}$ of the first serving cell, corresponding to the UL subframe n, according to one or more of predefined rules A is performed according to the following rules:

Rule 1: selecting the N DL subframes according to feedback delays;

Rule 2: selecting the N DL subframes with at least one DL subframe wherein the second serving cell corresponding to the at least one DL subframe is a UL subframe;

Rule 3: selecting the N DL subframes with one or more DL subframes wherein the second serving cell corresponding to the one or more DL subframes is a DL subframe;

Rule 4: indicating the N DL subframes through signalling;

Rule 5: predetermining the N DL subframes; and

Rule 6: selecting the N DL subframes according to Downlink Assignment Indexes (DAIs).

Preferably, the rule of selecting the N DL subframes according to the feedback delays refers to: selecting N DL subframes with the most approximate feedback delays; or, selecting N DL subframes with the smallest feedback delays; or, selecting N DL subframes with the largest feedback delays; or, selecting N DL subframes with the most approximate feedback delays and the smallest feedback delays; or, selecting N DL subframes with the most approximate feedback delays and the largest feedback delays.

Preferably, the rule of selecting the N DL subframes according to the DL DAIs refers to: selecting N DL subframes with relatively larger DL DAI values; or, selecting N DL subframes with relatively smaller DL DAI values.

Preferably, the manner of determining the HARQ-ACK information required to be transmitted by the serving cell according to the bundled ACKs/NACKs and the ACKs/NACKs corresponding to the remaining DL subframes refers to that HARQ-ACK information corresponding to the bundled ACKs/NACKs is the last one of the HARQ-ACK information required to be transmitted by the serving cell; or, when the second serving cell having the same subframe indexes with the N DL subframes is the DL subframes, a position of the HARQ-ACK information corresponding to the bundled ACKs/NACKs in the HARQ-ACK information required to be transmitted by the first serving cell is the same as a position of HARQ-ACK information corresponding to the DL subframe of the second serving cell in the HARQ-ACK information required to be transmitted by the second serving cell.

Preferably, the step of selecting the Q DL subframes from the second serving cell according to the predefined rules B is performed according to one or more of the following rules:

Rule 1: selecting the Q DL subframes according to feedback delays;

Rule 2: selecting the Q selected DL subframes which at least include a DL subframe which is correspondingly a UL subframe of the second serving cell;

Rule 3: indicating the Q DL subframes through signalling;

Rule 4: predetermining the Q DL subframes; and

Rule 5: selecting the Q DL subframes according to DAIs.

Preferably, the rule of selecting the Q DL subframes according to the feedback delays refers to selecting Q DL subframes with the most approximate feedback delays; or, selecting Q DL subframes with the smallest feedback delays; or, selecting Q DL subframes with the largest feedback delays; or, selecting Q DL subframes with the most approximate feedback delays and the smallest feedback delays; or, selecting Q DL subframes with the most approximate feedback delays and the largest feedback delays.

Preferably, the rule of selecting the Q DL subframes according to the DAIs refers to selecting Q DL subframes with relatively larger DAI values; or, selecting Q DL subframes with relatively smaller DAI values.

Preferably, a value of Q meets M−Q=Y and/or X+Q=Y, and Y=ceil((M+X)/2), and wherein ceil represents rounding up to an integer.

Preferably, the step of determining the HARQ-ACK information required to be transmitted by the second serving cell according to the ACKs/NACKs corresponding to the X+Q DL subframes refers to that HARQ-ACK information corresponding to the ACKs/NACKs of the Q DL subframes is determined as the last Q pieces of the HARQ-ACK information required to be transmitted by the second serving cell.

Preferably, the first serving cell is a secondary serving cell, or an FDD serving cell, or a scheduled serving cell.

Preferably, the second serving cell is a primary serving cell, or a TDD serving cell, or a scheduling serving cell.

The disclosure will be further described below with reference to specific embodiments.

Embodiment 1

Figure 3:
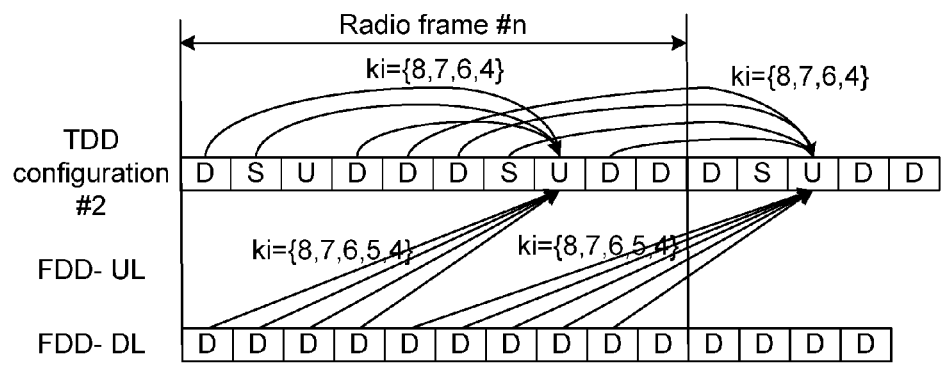
FIG. 3 is a diagram of frame mapping in a method for response information transmission according to embodiment 1 of the disclosure.

As shown in FIG. 3, it is supposed that an FDD serving cell and a TDD serving cell with a UL-DL configuration #2 are aggregated, wherein the TDD serving cell is a primary serving cell. DL subframes, corresponding to UL subframe #n=7, of the primary serving cell are {#n−8, #n−7, #n−4, #n−6}, and corresponding DL subframes of a secondary serving cell are {#n−8, #n−7, #n−5, #n−4, #n−6}.

For the primary serving cell, HARQ-ACK information {HARQ-ACK(0), HARQ-ACK(1), HARQ-ACK(2), HARQ-ACK(3)} required to be transmitted by the primary serving cell is obtained according to ACKs/NACKs corresponding to the DL subframes {#n−8, #n−7, #n−4, #n−6}, wherein the operation that the HARQ-ACK information is obtained according to the ACKs/NACKs belongs to a conventional art, and will not be elaborated herein.

For the secondary serving cell, N DL subframes are selected from the DL subframes {#n−8, #n−7, #n−5, #n−4, #n−6}, ACKs/NACKs corresponding to the N DL subframes are bundled, wherein a value of N is determined so as to make the total number of the bundled ACKs/NACKs and ACKs/NACKs corresponding to the remaining M−N DL subframes equal to 4, i.e., the number of the ACKs/NACKs from the DL subframes, corresponding to the UL subframe n, of the primary serving cell. That is, N=2, two DL subframes are selected according to rule 1 and rule 2 and ACKs/NACKs corresponding to the two DL subframes are bundled. That is, an ACK/NACK corresponding to the DL subframe #n−5 and an ACK/NACK corresponding to the DL subframe #n−4 are bundled, and HARQ-ACK information {HARQ-ACK(0), HARQ-ACK(1), HARQ-ACK(2), HARQ-ACK(3)} required to be transmitted by the secondary serving cell is obtained according to the bundled ACKs/NACKs and ACKs/NACKs corresponding to the DL subframes #n−8, #n−7 and #n−6, wherein HARQ-ACK information corresponding to the bundled ACKs/NACKs is HARQ-ACK(3), or, the HARQ-ACK information corresponding to the bundled ACKs/NACKs is HARQ-ACK(2).

The obtained HARQ-ACK information is transmitted on a PUCCH or a PUSCH, which also belongs to the conventional art, and will not be elaborated herein.

The obtained HARQ-ACK information is transmitted via the PUCCH or the PUSCH by adopting the conventional art, which will not be elaborated herein.

Embodiment 2

Figure 4:
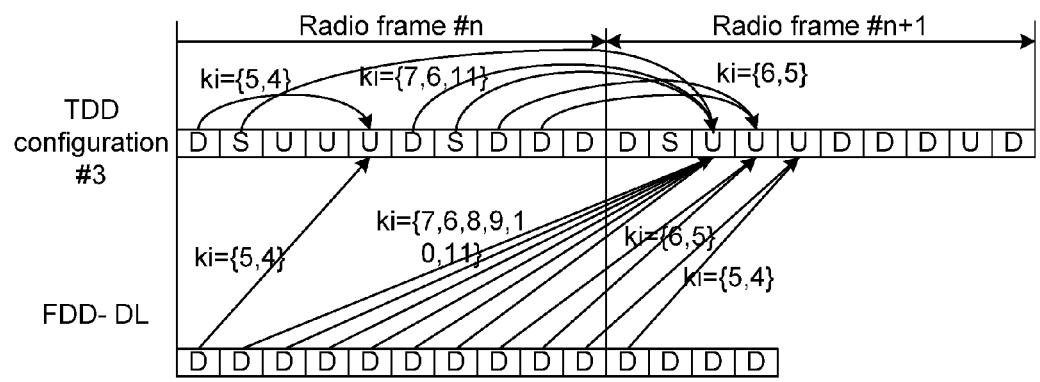
FIG. 4 is a diagram of frame mapping in a method for response information transmission according to embodiment 2 of the disclosure.

As shown in FIG. 4, it is supposed that an FDD serving cell and a TDD serving cell with a UL-DL configuration #3 are aggregated, wherein the TDD serving cell is a primary serving cell. DL subframes of the primary serving cell, corresponding to UL subframe #n=2, are {#n−7, #n−6, #n−11}, and corresponding DL subframes of a secondary serving cell are {#n−10, #n−9, #n−8, #n−7, #n−6, #n−11}.

EXAMPLE 1

For the primary serving cell, HARQ-ACK information {HARQ-ACK(0), HARQ-ACK(1), HARQ-ACK(2)} required to be transmitted by the primary serving cell is obtained according to ACKs/NACKs corresponding to the DL subframes {#n−7, #n−6, #n−11}, wherein the operation that the HARQ-ACK information is obtained according to the ACKs/NACKs belongs to the conventional art, and will not be elaborated herein.

For the secondary serving cell, N DL subframes are selected from the DL subframes {#n−10, #n−9, #n−8, #n−7, #n−6, #n−11}, ACKs/NACKs corresponding to the N DL subframes are bundled, wherein a value of N is determined so as to make the total number of the bundled ACKs/NACKs and ACKs/NACKs corresponding to the other M−N DL subframes equal to 3, i.e., the number of the ACKs/NACKs from the DL subframes of the primary serving cell, corresponding to the UL subframe n. That is, N=3, a base station and UE predetermine that the ACKs/NACKs corresponding to the DL subframes #n−10, #n−9 and #n−8 and the ACK/NACK corresponding to the DL subframe #n−7 are bundled, and HARQ-ACK information {HARQ-ACK(0), HARQ-ACK(1), HARQ-ACK(2)} required to be transmitted by the secondary serving cell is obtained according to the bundled ACKs/NACKs and the ACKs/NACKs corresponding to the DL subframes #n−11 and #n−6, wherein HARQ-ACK information corresponding to the bundled ACKs/NACKs is HARQ-ACK(2), or, the HARQ-ACK information corresponding to the bundled ACKs/NACKs is HARQ-ACK(1).

The obtained HARQ-ACK information is transmitted on a PUCCH or a PUSCH, which also belongs to the conventional art, and will not be elaborated herein.

EXAMPLE 2

For the primary serving cell, the HARQ-ACK information {HARQ-ACK(0), HARQ-ACK(1), HARQ-ACK(2)} required to be transmitted by the primary serving cell is obtained according to the ACKs/NACKs corresponding to the DL subframes {#n−7, #n−6, #n−11}, wherein the operation that the HARQ-ACK information is obtained according to the ACKs/NACKs belongs to the conventional art, and will not be elaborated herein.

For the secondary serving cell, N DL subframes are selected from the DL subframes {#n−10, #n−9, #n−8, #n−7, #n−6, #n−11}, and ACKs/NACKs corresponding to the N DL subframes are bundled, wherein a value of N ensures that the total number of the bundled ACKs/NACKs and ACKs/NACKs of the remaining M−N DL subframes is equal to 4. That is, N=2, and it is supposed that the number of a part of the bundled ACKs/NACKs is 4. ACKs/NACKs corresponding to the DL subframes #n−10 and #n−9 and an ACK/NACK corresponding to the DL subframe #n−8 are bundled according to predefined rule 2, and HARQ-ACK information {HARQ-ACK(0), HARQ-ACK(1), HARQ-ACK(2), HARQ-ACK(3)} required to be transmitted by the secondary serving cell is obtained according to the bundled ACKs/NACKs and the ACKs/NACKs corresponding to the DL subframes #n−11, #n−7 and #n−6, wherein the HARQ-ACK information corresponding to the bundled ACKs/NACKs is HARQ-ACK(3), or, the HARQ-ACK information corresponding to the bundled ACKs/NACKs is HARQ-ACK(0).

The obtained HARQ-ACK information is transmitted via the PUCCH or the PUSCH by adopting the conventional art, which will not be elaborated herein.

EXAMPLE 3

First of all, the number Y=5 of pieces of the HARQ-ACK information required to be transmitted by the serving cells on the UL subframe n is calculated according to the total number 3 of the DL subframes {#n−7, #n−6, #n−11} of the primary serving cell, corresponding to the UL subframe n, and the total number 6 of the DL subframes {#n−10, #n−9, #n−8, #n−7, #n−6, #n−11} of the secondary serving cell, corresponding to the UL subframe n.

For the secondary serving cell, ACKs/NACKs corresponding to Q DL subframes are selected from the secondary serving cell according to a predefined rule, wherein Q meets Q+X=Y, that is, Q=2. The ACKs/NACKs corresponding to the DL subframes #n−9 and #n−8 and the ACKs/NACKs corresponding to the DL subframes {#n−11, #n−7, #n−6} of the primary serving cell are combined into the HARQ-ACK information {HARQ-ACK(0), HARQ-ACK(1), HARQ-ACK(2), HARQ-ACK(3), HARQ-ACK(4)} required to be transmitted by the primary serving cell according to the predefined rule 2, wherein HARQ-ACK information corresponding to the DL subframes #n−9 and #n−8 is the last two pieces of HARQ-ACK information HARQ-ACK(3) and HARQ-ACK(4) of the primary serving cell.

For the secondary serving cell, the HARQ-ACK information {HARQ-ACK(0), HARQ-ACK(1), HARQ-ACK(2), HARQ-ACK(3), DTX} required to be transmitted by the primary serving cell is obtained according to ACKs/NACKs corresponding to the DL subframes {#n−11, #n−10, #n−7, #n−6}, wherein the operation that the HARQ-ACK information is obtained according to the ACKs/NACKs belongs to the conventional art, and will not be elaborated herein. The obtained HARQ-ACK information is transmitted on the PUCCH or the PUSCH, which also belongs to the conventional art, and will not be elaborated herein.

EXAMPLE 4

First of all, the number Y=5 of pieces of the HARQ-ACK information required to be transmitted by the serving cells on the UL subframe n are calculated according to the total number 3 of the DL subframes {#n−7, #n−6, #n−11} of the primary serving cell corresponding to the UL subframe n and the total number 6 of the DL subframes {#n−10, #n−9, #n−8, #n−7, #n−6, #n−11} of the secondary serving cell corresponding to the UL subframe n.

For the secondary serving cell, ACKs/NACKs corresponding to Q DL subframes are selected from the secondary serving cell according to a predefined rule, wherein Q meets M−Q=Y, that is, Q=1. An ACK/NACK of the DL subframe #n−9 and ACKs/NACKs corresponding to the DL subframes {#n−7, #n−6, #n−11} of the primary serving cell are combined into the HARQ-ACK information {HARQ-ACK(0), HARQ-ACK(1), HARQ-ACK(2), HARQ-ACK(3)} required to be transmitted by the primary serving cell according to predefined rule 4, wherein HARQ-ACK information corresponding to the DL subframe #n−9 is the last HARQ-ACK information HARQ-ACK(3) of the primary serving cell.

For the secondary serving cell, the HARQ-ACK information {HARQ-ACK(0), HARQ-ACK(1), HARQ-ACK(2), HARQ-ACK(3), HARQ-ACK(4)} required to be transmitted by the primary serving cell is obtained according to the ACKs/NACKs corresponding to the DL subframes {#n−10, #n−8, #n−6, #n−11}.

When the obtained HARQ-ACK information is transmitted via the PUCCH, a resource $n_{PUCCH}^{(1)}$ and a constellation point b(0),b(1) used for transmission are obtained according to the following mapping table. When the obtained HARQ-ACK information is transmitted via the PUSCH, coded bit input o(0),o(1),o(2),o(3) used for transmission is obtained according to the following mapping table.

TABLE 5

Mapping Table under M = 5

| primary serving cell | secondary serving cell | Resource | Constellation point | Coded bit input |
| --- | --- | --- | --- | --- |
| HARQ-ACK(0), HARQ-ACK(1), HARQ-ACK(2), HARQ-ACK(3), HARQ-ACK(4) | HARQ-ACK(0), HARQ-ACK(1), HARQ-ACK(2), HARQ-ACK(3), HARQ-ACK(4) | $n_{PUCCH}^{(1)}$ | b(0), b(1) | o(0), o(1), o(2), o(3) |
| ACK, ACK, ACK, NACK/DTX, any | ACK, ACK, ACK, NACK/DTX, any | $n_{PUCCH,1}^{(1)}$ | 1, 1 | 1, 1, 1, 1 |
| ACK, ACK, DTX, DTX, DTX | ACK, ACK, ACK, NACK/DTX, any | $n_{PUCCH,1}^{(1)}$ | 0, 0 | 1, 0, 1, 1 |
| ACK, ACK, ACK, ACK, ACK | ACK, ACK, ACK, NACK/DTX, any | $n_{PUCCH,1}^{(1)}$ | 0, 0 | 1, 0, 1, 1 |
| ACK, DTX, DTX, DTX, DTX | ACK, ACK, ACK, NACK/DTX, any | $n_{PUCCH,3}^{(1)}$ | 1, 1 | 0, 1, 1, 1 |
| ACK, ACK, ACK, ACK, N/D | ACK, ACK, ACK, NACK/DTX, any | $n_{PUCCH,3}^{(1)}$ | 1, 1 | 0, 1, 1, 1 |
| NACK, any, any, any, any | ACK, ACK, ACK, NACK/DTX, any | $n_{PUCCH,3}^{(1)}$ | 0, 1 | 0, 0, 1, 1 |

TABLE 5-continued

Mapping Table under M = 5

| primary serving cell | secondary serving cell | Resource | Constellation point | Coded bit input |
|---|---|---|---|---|
| (ACK, NACK/DTX, any, any, any), except for (ACK, DTX, DTX, DTX) | ACK, ACK, ACK, NACK/DTX, any | $n_{PUCCH,3}^{(1)}$ | 0, 1 | 0, 0, 1, 1 |
| (ACK, ACK, NACK/DTX, any, any) except for (ACK, ACK, DTX, DTX, DTX) | ACK, ACK, ACK, NACK/DTX, any | $n_{PUCCH,3}^{(1)}$ | 0, 1 | 0, 0, 1, 1 |
| ACK, ACK, ACK, NACK/DTX, any | ACK, ACK, DTX, DTX, DTX | $n_{PUCCH,0}^{(1)}$ | 1, 0 | 1, 1, 1, 0 |
| ACK, ACK, DTX, DTX, DTX | ACK, ACK, DTX, DTX, DTX | $n_{PUCCH,0}^{(1)}$ | 1, 0 | 1, 0, 1, 0 |
| ACK, ACK, ACK, ACK, ACK | ACK, ACK, DTX, DTX, DTX | $n_{PUCCH,0}^{(1)}$ | 1, 0 | 1, 0, 1, 0 |
| ACK, DTX, DTX, DTX, DTX | ACK, ACK, DTX, DTX, DTX | $n_{PUCCH,0}^{(1)}$ | 0, 1 | 0, 1, 1, 0 |
| ACK, ACK, ACK, ACK, DTX | ACK, ACK, DTX, DTX, DTX | $n_{PUCCH,0}^{(1)}$ | 0, 1 | 0, 1, 1, 0 |
| NACK, any, any, any, any | ACK, ACK, DTX, DTX, DTX | $n_{PUCCH,3}^{(1)}$ | 0, 0 | 0, 0, 1, 0 |
| (ACK, NACK/DTX, any, any, any) except for (ACK, DTX, DTX, DTX, DTX) | ACK, ACK, DTX, DTX, DTX | $n_{PUCCH,3}^{(1)}$ | 0, 0 | 0, 0, 1, 0 |
| (ACK, ACK, NACK/DTX, any, any) except for (ACK, ACK, DTX, DTX, DTX) | ACK, ACK, DTX, DTX, DTX | $n_{PUCCH,3}^{(1)}$ | 0, 0 | 0, 0, 1, 0 |
| ACK, ACK, ACK, NACK/DTX, any | ACK, ACK, ACK, ACK, ACK | $n_{PUCCH,0}^{(1)}$ | 1, 0 | 1, 1, 1, 0 |
| ACK, ACK, DTX, DTX, DTX | ACK, ACK, ACK, ACK, ACK | $n_{PUCCH,0}^{(1)}$ | 1, 0 | 1, 0, 1, 0 |
| ACK, ACK, ACK, ACK, ACK | ACK, ACK, ACK, ACK, ACK | $n_{PUCCH,0}^{(1)}$ | 1, 0 | 1, 0, 1, 0 |
| ACK, DTX, DTX, DTX, DTX | ACK, ACK, ACK, ACK, ACK | $n_{PUCCH,0}^{(1)}$ | 0, 1 | 0, 1, 1, 0 |
| ACK, ACK, ACK, ACK, DTX | ACK, ACK, ACK, ACK, ACK | $n_{PUCCH,0}^{(1)}$ | 0, 1 | 0, 1, 1, 0 |
| NACK, any, any, any, any | ACK, ACK, ACK, ACK, ACK | $n_{PUCCH,3}^{(1)}$ | 0, 0 | 0, 0, 1, 0 |
| (ACK, NACK/DTX, any, any, any) except for (ACK, DTX, DTX, DTX, DTX) | ACK, ACK, ACK, ACK, ACK | $n_{PUCCH,3}^{(1)}$ | 0, 0 | 0, 0, 1, 0 |
| (ACK, ACK, NACK/DTX, any, any) except for (ACK, ACK, DTX, DTX, DTX) | ACK, ACK, ACK, ACK, ACK | $n_{PUCCH,3}^{(1)}$ | 0, 0 | 0, 0, 1, 0 |
| ACK, ACK, ACK, NACK/DTX, any | ACK, DTX, DTX, DTX, DTX | $n_{PUCCH,2}^{(1)}$ | 1, 1 | 1, 1, 0, 1 |
| ACK, ACK, DTX, DTX, DTX | ACK, DTX, DTX, DTX, DTX | $n_{PUCCH,2}^{(1)}$ | 0, 1 | 1, 0, 0, 1 |
| ACK, ACK, ACK, ACK, ACK | ACK, DTX, DTX, DTX, DTX | $n_{PUCCH,2}^{(1)}$ | 0, 1 | 1, 0, 0, 1 |
| ACK, DTX, DTX, DTX, DTX | ACK, DTX, DTX, DTX, DTX | $n_{PUCCH,2}^{(1)}$ | 1, 0 | 0, 1, 0, 1 |
| ACK, ACK, ACK, ACK, DTX | ACK, DTX, DTX, DTX, DTX | $n_{PUCCH,2}^{(1)}$ | 1, 0 | 0, 1, 0, 1 |
| NACK, any, any, any, any | ACK, DTX, DTX, DTX, DTX | $n_{PUCCH,2}^{(1)}$ | 0, 0 | 0, 0, 0, 1 |
| (ACK, NACK/DTX, any, any, any) except for (ACK, DTX, DTX, DTX, DTX) | ACK, DTX, DTX, DTX, DTX | $n_{PUCCH,2}^{(1)}$ | 0, 0 | 0, 0, 0, 1 |

TABLE 5-continued

| | Mapping Table under M = 5 | | | |
|---|---|---|---|---|
| primary serving cell | secondary serving cell | Resource | Constellation point | Coded bit input |
| (ACK, ACK, NACK/DX, any, any) except for (ACK, ACK, DTX, DTX, DTX) | ACK, DTX, DTX, DTX, DTX | $n_{PUCCH,2}^{(1)}$ | 0, 0 | 0, 0, 0, 1 |
| ACK, ACK, ACK, NACK/DTX, any | ACK, ACK, ACK, ACK, N/D | $n_{PUCCH,2}^{(1)}$ | 1, 1 | 1, 1, 0, 1 |
| ACK, ACK, DTX, DTX, DTX | ACK, ACK, ACK, ACK, N/D | $n_{PUCCH,2}^{(1)}$ | 0, 1 | 1, 0, 0, 1 |
| ACK, ACK, ACK, ACK, ACK | ACK, ACK, ACK, ACK, N/D | $n_{PUCCH,2}^{(1)}$ | 0, 1 | 1, 0, 0, 1 |
| ACK, DTX, DTX, DTX, DTX | ACK, ACK, ACK, ACK, N/D | $n_{PUCCH,2}^{(1)}$ | 1, 0 | 0, 1, 0, 1 |
| ACK, ACK, ACK, ACK, DTX | ACK, ACK, ACK, ACK, N/D | $n_{PUCCH,2}^{(1)}$ | 1, 0 | 0, 1, 0, 1 |
| NACK, any, any, any, any | ACK, ACK, ACK, ACK, N/D | $n_{PUCCH,2}^{(1)}$ | 0, 0 | 0, 0, 0, 1 |
| (ACK, NACK/DTX, any, any, any) except for (ACK, DTX, DTX, DTX, DTX) | ACK, ACK, ACK, ACK, N/D | $n_{PUCCH,2}^{(1)}$ | 0, 0 | 0, 0, 0, 1 |
| (ACK, ACK, NACK/DTX, any, any) except for (ACK, ACK, DTX, DTX, DTX) | ACK, ACK, ACK, ACK, N/D | $n_{PUCCH,2}^{(1)}$ | 0, 0 | 0, 0, 1, 0 |
| ACK, ACK, ACK, NACK/DTX, any | NACK/DTX, any, any, any, any | $n_{PUCCH,1}^{(1)}$ | 1, 0 | 1, 1, 0, 0 |
| ACK, ACK, ACK, NACK/DTX, any | (ACK, NACK/DTX, any, any, any) except for (ACK, DTX, DTX, DTX, DTX) | $n_{PUCCH,1}^{(1)}$ | 1, 0 | 1, 1, 0, 0 |
| ACK, ACK, ACK, NACK/DTX, any | (ACK, ACK, NACK/DTX, any, any) except for (ACK, ACK, DTX, DTX, DTX) | $n_{PUCCH,1}^{(1)}$ | 1, 0 | 1, 1, 0, 0 |
| ACK, ACK, DTX, DTX, DTX | NACK/DTX, any, any, any, any | $n_{PUCCH,1}^{(1)}$ | 0, 1 | 1, 0, 0, 0 |
| ACK, ACK, DTX, DTX, DTX | (ACK, NACK/DTX, any, any, any) except for (ACK, DTX, DTX, DTX, DTX) | $n_{PUCCH,1}^{(1)}$ | 0, 1 | 1, 0, 0, 0 |
| ACK, ACK, DTX, DTX, DTX | (ACK, ACK, NACK/DTX, any, any) except for (ACK, ACK, DTX, DTX, DTX) | $n_{PUCCH,1}^{(1)}$ | 0, 1 | 1, 0, 0, 0 |
| ACK, ACK, ACK, ACK, ACK | NACK/DTX, any, any, any, any | $n_{PUCCH,1}^{(1)}$ | 0, 1 | 1, 0, 0, 0 |
| ACK, ACK, ACK, ACK, ACK | (ACK, NACK/DTX, any, any, any) except for (ACK, DTX, DTX, DTX, DTX) | $n_{PUCCH,1}^{(1)}$ | 0, 1 | 1, 0, 0, 0 |
| ACK, ACK, ACK, ACK, ACK | (ACK, ACK, NACK/DTX, any, any) except for (ACK, ACK, DTX, DTX, DTX) | $n_{PUCCH,1}^{(1)}$ | 0, 1 | 1, 0, 0, 0 |
| ACK, DTX, DTX, DTX, DTX | NACK/DTX, any, any, any, any | $n_{PUCCH,0}^{(1)}$ | 1, 1 | 0, 1, 0, 0 |
| ACK, DTX, DTX, DTX, DTX | (ACK, NACK/DTX, any, any, any) except for (ACK, DTX, DTX, DTX, DTX) | $n_{PUCCH,0}^{(1)}$ | 1, 1 | 0, 1, 0, 0 |
| ACK, DTX, DTX, DTX, DTX | (ACK, ACK, NACK/DTX, any, any) except for (ACK, ACK, DTX, DTX, DTX) | $n_{PUCCH,0}^{(1)}$ | 1, 1 | 0, 1, 0, 0 |

TABLE 5-continued

Mapping Table under M = 5

| primary serving cell | secondary serving cell | Resource | Constellation point | Coded bit input |
|---|---|---|---|---|
| ACK, ACK, ACK, ACK, DTX | NACK/DTX, any, any, any, any | $n_{PUCCH,0}^{(1)}$ | 1, 1 | 0, 1, 0, 0 |
| NACK, ACK, ACK, ACK, DTX | (ACK, NACK/DTX, any, any, any) except for (ACK, DTX, DTX, DTX, DTX) | $n_{PUCCH,0}^{(1)}$ | 1, 1 | 0, 1, 0, 0 |
| ACK, ACK, ACK, ACK, DTX | (ACK, ACK, NACK/DTX, any, any) except for (ACK, ACK, DTX, DTX, DTX) | $n_{PUCCH,0}^{(1)}$ | 1, 1 | 0, 1, 0, 0 |
| DTX, any, any, any, any | NACK/DTX, any, any, any, any | No transmission | | 0, 0, 0, 0 |
| DTX, any, any, any, any | (ACK, ACK, NACK/DTX, any, any) except for (ACK, ACK, DTX, DTX, DTX) | No transmission | | 0, 0, 0, 0 |
| DTX, any, any, any, any | (ACK, ACK, NACK/DTX, any, any) except for (ACK, DTX, DTX, DTX, DTX) | No transmission | | 0, 0, 0, 0 |

EXAMPLE 5

First of all, the number Y=5 of pieces of the HARQ-ACK information required to be transmitted by the serving cells on the UL subframe n is calculated according to the total number 3 of the DL subframes {#n−7, #n−6, #n−11}, corresponding to the UL subframe n, of the primary serving cell and the total number 6 of the DL subframes {#n−10, #n−9, #n−8, #n−7, #n−6, #n−11}, corresponding to the UL subframe n, of the secondary serving cell.

For the secondary serving cell, ACKs/NACKs corresponding to Q DL subframes are selected from the secondary serving cell according to a predefined rule, wherein Q meets M−Q=Y, that is, Q=1. The ACK/NACK corresponding to the DL subframe #n−9 and the ACKs/NACKs corresponding to the DL subframes {#n−7, #n−6, #n−11} of the primary serving cell are combined into the HARQ-ACK information {HARQ-ACK(0), HARQ-ACK(1), HARQ-ACK(2), HARQ-ACK(3)} required to be transmitted by the primary serving cell according to the predefined rule 4, wherein the HARQ-ACK information corresponding to the DL subframe #n−9 is the last HARQ-ACK information HARQ-ACK(3) of the primary serving cell.

For the secondary serving cell, since Y=5, the ACKs/NACKs corresponding to the two DL subframes {#n−7, #n−6} with larger DAIs in the DL subframes {#n−10, #n−9, #n−8, #n−7, #n−6, #n−11} are bundled at first, and the HARQ-ACK information {HARQ-ACK(0), HARQ-ACK(1), HARQ-ACK(2), HARQ-ACK(3)} required to be transmitted by the secondary serving cell is obtained according to the bundled ACKs/NACKs and the ACKs/NACKs corresponding to the DL subframes {#n−10, #n−8, #n−11}.

The obtained HARQ-ACK information is transmitted on the PUCCH or the PUSCH, which also belongs to the conventional art, and will not be elaborated herein.

Figure 5:
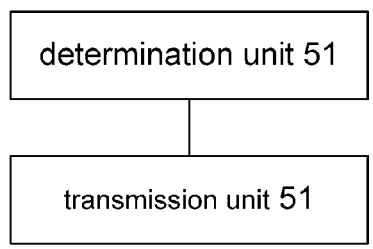
FIG. 5 is a structure diagram of a device for response information transmission according to an embodiment of the disclosure.

FIG. 5 is a structure diagram of a device for response information transmission according to an embodiment of the disclosure. As shown in FIG. 5, the device for response information transmission according to the embodiment includes a determination unit 51 and a transmission unit 52.

The determination unit 51 is configured to, when a TDD serving cell and an FDD serving cell perform CA and it is configured that a manner of PUCCH format 1b with channel selection is adopted to transmit HARQ-ACK information, determine HARQ-ACK information transmitted by a first serving cell and a second serving cell on a UL subframe in one of the three following manners:

Manner 1: selecting N DL subframes from M DL subframes {n−k$_0$, n−k$_1$, . . . , n−k$_{M−1}$}, corresponding to the UL subframe, of the first serving cell according to one or more of predefined rule A, bundling ACKs/NACKs corresponding to the N selected DL subframes, determining the HARQ-ACK information required to be transmitted by the first serving cell according to the bundled ACKs/NACKs and ACKs/NACKs corresponding to the remaining DL subframes, and determining the HARQ-ACK information required to be transmitted by the second serving cell according to ACKs/NACKs corresponding to X DL subframes {n−k$_0^P$, n−k$_1^P$, . . . , n−k$_{X−1}^P$} corresponding to the UL subframe, of the second serving cell;

Manner 1: selecting N Downlink (DL) subframes from M DL subframes {n−k$_0$, n−k$_1$, . . . , n−k$_{M−1}$} of the first serving cell, corresponding to UL subframes, according to one or more of predefined rules A, bundling ACKs/Negative Acknowledgements (NACKs) of the N selected DL subframes, determining the HARQ-ACK information required to be transmitted by the first serving cell according to the bundled ACKs/NACKs and ACKs/NACKs corresponding to the remaining DL subframes, and determining the HARQ-ACK information required to be transmitted by the second serving cell according to ACKs/NACKs of X DL subframes {n−k$_0^P$, n−k$_1^P$, . . . , n−k$_{X−1}^P$} of the second serving cell, corresponding to the UL subframe;

Manner 2: selecting Q DL subframes from the M DL subframes {n−k$_0$, n−k$_1$, . . . , n−k$_{M−1}$} of the first serving cell, corresponding to the UL subframe, according to one or more of predefined rules B, determining the HARQ-ACK information required to be transmitted by the first serving cell according to ACKs/NACKs corresponding to M−Q DL subframes, and determining the HARQ-ACK information required to be transmitted by the second serving cell according to ACKs/NACKs corresponding to X+Q DL subframes; and Manner 3: selecting Q DL subframes from the M DL subframes $\{n-k_0, n-k_1, \ldots, n-k_{M-1}\}$ of the first serving cell, corresponding to the UL subframe, according to one or more of predefined rules B, selecting N DL subframes from M−Q DL subframes of the first serving cell according to one or more of predefined rules A if M−Q>4, bundling ACKs/NACKs corresponding to the N selected DL subframes, and determining the HARQ-ACK information required to be transmitted by the first serving cell according to the bundled ACKs/NACKs and ACKs/NACKs corresponding to the remaining DL subframes, and if M−Q≤4, determining the HARQ-ACK information required to be transmitted by the first serving cell according to ACKs/NACKs corresponding to M−Q DL subframes; if X+Q>4, selecting N DL subframes from X+Q DL subframes of the second serving cell according to one or more of predefined rules A, bundling ACKs/NACKs corresponding to the N selected DL subframes, and determining the HARQ-ACK information required to be transmitted by the second serving cell on the UL subframe according to the bundled ACKs/NACKs and the remaining DL subframes, and if X+Q≤4, determining the HARQ-ACK information required to be transmitted by the second serving cell according to ACKs/NACKs corresponding to the X+Q DL subframes, wherein M is a positive integer more than 4.

The transmission unit 52 is configured to transmit the determined HARQ-ACK information via a PUCCH or a PUSCH.

Preferably, a value of N is determined to make the total number of the bundled ACKs/NACKs and the ACKs/NACKs corresponding to the remaining DL subframes equal to the number of the ACKs/NACKs corresponding to the DL subframes of the second serving cell, or, the value of N is determined to make the total number of the bundled ACKs/NACKs and the ACKs/NACKs corresponding to the remaining DL subframes equal to 4.

Preferably, the predefined rule A is at least one of the following rules:

Rule 1: the N DL subframes are selected according to feedback delays;

Rule 2: the N selected DL subframes at least include one DL subframe wherein the second serving cell corresponding to the at least one DL subframe is a UL subframe;

Rule 3: the N selected DL subframes include one or more DL subframes wherein the second serving cell corresponding to the one or more DL subframes is a DL subframe;

Rule 4: the N DL subframes are indicated through signalling; Rule 5: the N DL subframes are predetermined; and Rule 6: the N DL subframes are selected according to Downlink Assignment Indexes (DAIs).

Preferably, the determination unit 51 selects the N DL subframes according to the feedback delays, including that:

the determination unit 51 selects N DL subframes with the most approximate feedback delays; or, the determination unit 51 selects N DL subframes with the smallest feedback delays; or, the determination unit 51 selects N DL subframes with the largest feedback delays; or, the determination unit 51 selects N DL subframes with the most approximate feedback delays and the smallest feedback delays; or, the determination unit 51 selects N DL subframes with the most approximate feedback delays and the largest feedback delays.

Preferably, the rule that the N DL subframes are selected according to the DAIs includes that:

N DL subframes with relatively larger DAI values are selected; or,

N DL subframes with relatively smaller DAI values are selected.

Preferably, the operation of determining the HARQ-ACK information required to be transmitted by the serving cell according to the bundled ACKs/NACKs and the ACKs/NACKs corresponding to the remaining DL subframes includes that:

HARQ-ACK information corresponding to the bundled ACKs/NACKs is the last of the HARQ-ACK information required to be transmitted by the first serving cell; or, when the second serving cell having the same subframe indexes with the N DL subframes is the DL subframes, a position of the HARQ-ACK information corresponding to the bundled ACKs/NACKs in the HARQ-ACK information required to be transmitted by the first serving cell is the same as a position of HARQ-ACK information of the corresponding DL subframe of the second serving cell in the HARQ-ACK information required to be transmitted by the second serving cell.

Preferably, the predefined rule B is at least one of the following rules:

Rule 1: the Q DL subframes are selected according to feedback delays;

Rule 2: the Q selected DL subframes with at least one DL subframe wherein the second serving cell corresponding to the at least one DL subframe is a UL subframe;

Rule 3: the Q DL subframes are indicated through signalling;

Rule 4: the Q DL subframes are predetermined; and

Rule 5: the Q DL subframes are selected according to DAIs.

Preferably, the rule that the Q DL subframes are selected according to the feedback delays includes that:

Q DL subframes with the most approximate feedback delays are selected; or,

Q DL subframes with the smallest feedback delays are selected; or,

Q DL subframes with the largest feedback delays are selected; or,

Q DL subframes with the most approximate feedback delays and the smallest feedback delays are selected; or, Q DL subframes with the most approximate feedback delays and the largest feedback delays are selected.

The rule that the Q DL subframes are selected according to the DAIs includes that:

Q DL subframes with relatively larger DAI values are selected; or,

Q DL subframes with relatively smaller DAI values are selected.

Preferably, the device for response information transmission shown in FIG. 5 further includes:

a forming unit (not shown in FIG. 5), configured to determine HARQ-ACK information corresponding to the ACKs/NACKs corresponding to the Q DL subframes as the last Q pieces of the HARQ-ACK information required to be transmitted by the second serving cell.

In the embodiment of the disclosure, the first serving cell is a secondary serving cell, or an FDD serving cell, or a scheduled serving cell; and the second serving cell is a primary serving cell, or a TDD serving cell, or a scheduling serving cell.

In the embodiment of the disclosure, a value of Q meets M−Q=Y and/or X+Q=Y, wherein Y=ceil ((M+X)/2), and ceil represents rounding up to an integer.

Those skilled in the art should know that functions realized by each processing unit in the device for response information transmission shown in FIG. 5 may be understood with reference to related description in the abovementioned method for response information transmission. Those skilled in the art should know that the functions of each processing unit in the device for response information transmission shown in FIG. 5 may be realized by a program running on a processor, and may also be realized by a specific logical circuit.

The embodiment of the disclosure further includes a storage medium, in which a computer program is stored, the computer program being configured to execute the method for response information transmission of each of the abovementioned embodiments.

Apparently, those skilled in the art should know that each processing unit or each step in the disclosure may be implemented by a universal computing device, may be concentrated on a single computing device or distributed on a network formed by a plurality of computing devices. Optionally each processing unit or each step in the disclosure may be implemented by programmable codes executable by the computing devices, so that they may be stored in a storage device for execution with the computing devices, or may form respective integrated circuit module respectively, or multiple modules or steps therein may form a single integrated circuit module for implementation. As a consequence, the disclosure is not limited to any specific hardware and software combination.

The embodiment of the disclosure further includes UE, which includes the device for response information transmission shown in FIG. 5.

The embodiment of the disclosure further recites a base station, which receives response information transmitted by the device for response information transmission shown in FIG. 5.

The above is only the embodiment of the disclosure and not intended to limit the disclosure, and for those skilled in the art, the disclosure may have various modifications and variations. Any modifications, equivalent replacements, improvements and the like made within the spirit and principle of the disclosure shall fall within the scope of the claims of the disclosure. For example, a system applied by the disclosure is not limited to an LTE system.

Those skilled in the art should understand that all or part of steps in the method may be implemented by related hardware instructed by a program, and the program may be stored in a computer-readable storage medium, such as a read-only memory, a magnetic disk or a compact disc. Optionally, all or part of steps of the embodiment may also be implemented by one or more integrated circuits. Correspondingly, each module/unit of the embodiment may be implemented in form of hardware, and may also be implemented in form of software function module. The disclosure is not limited to hardware and software combination in any specific form.

INDUSTRIAL APPLICABILITY

By the disclosure, transmission of HARQ-ACK information with PUCCH format 1b with channel selection during TDD-FDD CA may be implemented.

The invention claimed is:

1. A method for response information transmission, comprising:
    when a Time Division Duplex (TDD) serving cell and a Frequency Division Duplex (FDD) serving cell perform Carrier Aggregation (CA) and it is configured to use a Physical Uplink Control Channel (PUCCH) format 1b with channel selection for transmission of Hybrid Automatic Repeat Request-Acknowledgement (HARQ-ACK) information, determining HARQ-ACK information to be transmitted on an Uplink (UL) subframe by a first serving cell and a second serving cell, and transmitting the determined HARQ-ACK information via a PUCCH or a Physical Uplink Shared Channel (PUSCH):
    selecting Q DL subframes from the M DL subframes $\{n-k_0, n-k_1, \ldots, n-k_{M-1}\}$ of the first serving cell, corresponding to the UL subframe, according to one or more of predefined rules B, selecting N DL subframes from M−Q DL subframes of the first serving cell according to one or more of predefined rules A if M−Q>4, bundling ACKs/NACKs corresponding to the N selected DL subframes, and determining the HARQ-ACK information required to be transmitted by the first serving cell according to the bundled ACKs/NACKs and ACKs/NACKs corresponding to the remaining DL subframes, and if M−Q≤4, determining the HARQ-ACK information required to be transmitted by the first serving cell according to ACKs/NACKs corresponding to M−Q DL subframes; if X+Q>4, selecting N DL subframes from X+Q DL subframes according to one or more of predefined rules A, bundling ACKs/NACKs corresponding to the N selected DL subframes, and determining the HARQ-ACK information required to be transmitted by the second serving cell on the UL subframe according to the bundled ACKs/NACKs and the ACKs/NACKs corresponding to the remaining DL subframes, and if X+Q≤4, determining the HARQ-ACK information required to be transmitted by the second serving cell according to ACKs/NACKs corresponding to the X+Q DL subframes,
    wherein M is a positive integer more than 4,
    wherein a value of N is determined to make the total number of the bundled ACKs/NACKs and the ACKs/NACKs corresponding to the remaining DL subframes equal to the number of the ACKs/NACKs corresponding to the DL subframes of the second serving cell; or, the value of N is determined to make the total number of the bundled ACKs/NACKs and the ACKs/NACKs corresponding to the remaining DL subframes equal to 4.

2. The method according to claim 1, wherein the predefined rules A comprise at least one of the following rules:
    Rule 1: selecting the N DL subframes according to feedback delays;
    Rule 2: selecting the N DL subframes with at least one DL subframe wherein the second serving cell corresponding to the at least one DL subframe is a UL subframe;
    Rule 3: selecting the N DL subframes with one or more DL subframes wherein the second serving cell corresponding to the one or more DL subframes is a DL subframe;
    Rule 4: indicating the N DL subframes through signalling;
    Rule 5: predetermining the N DL subframes; and
    Rule 6: selecting the N DL subframes according to Downlink Assignment Indexes (DAIs).

3. The method according to claim 2, wherein the rule of selecting the N DL subframes according to the feedback delays comprises:
  selecting N DL subframes with the most approximate feedback delays; or,
  selecting N DL subframes with the smallest feedback delays; or,
  selecting N DL subframes with the largest feedback delays; or,
  selecting N DL subframes with the most approximate feedback delays and the smallest feedback delays; or,
  selecting N DL subframes with the most approximate feedback delays and the largest feedback delays; and
  wherein the rule of selecting the N DL subframes according to the DAIs comprises:
  selecting N DL subframes with relatively larger DAI values; or,
  selecting N DL subframes with relatively smaller DAI values.

4. The method according to claim 1, wherein determining the HARQ-ACK information required to be transmitted by the serving cell according to the bundled ACKs/NACKs and the ACKs/NACKs corresponding to the remaining DL subframes comprises that:
  HARQ-ACK information corresponding to the bundled ACKs/NACKs is the last one of the HARQ-ACK information required to be transmitted by the serving cell; or,
  when the second serving cell having the same subframe indexes with the N DL subframes is the DL subframes, a position of the HARQ-ACK information corresponding to the bundled ACKs/NACKs in the HARQ-ACK information required to be transmitted by the first serving cell is the same as a position of HARQ-ACK information corresponding to the DL subframes of the second serving cell in the HARQ-ACK information required to be transmitted by the second serving cell.

5. The method according to claim 1, wherein the predefined rules B comprises at least one of the following rules:
  Rule 1: selecting the Q DL subframes according to feedback delays;
  Rule 2: selecting the Q DL subframes with at least one DL subframe wherein the second serving cell corresponding to the at least one DL subframe is a UL subframe;
  Rule 3: indicating the Q DL subframes through signalling;
  Rule 4: predetermining the Q DL subframes; and
  Rule 5: selecting the Q DL subframes according to DAIs.

6. The method according to claim 5, wherein the rule of selecting the Q DL subframes according to the feedback delays comprises:
  selecting Q DL subframes with the most approximate feedback delays; or,
  selecting Q DL subframes with the smallest feedback delays; or,
  selecting Q DL subframes with the largest feedback delays; or,
  selecting Q DL subframes with the most approximate feedback delays and the smallest feedback delays; or,
  selecting Q DL subframes with the most approximate feedback delays and the largest feedback delays; and
  wherein the rule of selecting the Q DL subframes according to the DAIs comprises:
  selecting Q DL subframes with relatively larger DAI values; or,
  selecting Q DL subframes with relatively smaller DAI values.

7. The method according to claim 1, wherein a value of Q meets M−Q=Y and/or X+Q=Y, and Y=ceil ((M+X)/2), and wherein ceil represents rounding up to an integer.

8. The method according to claim 1, wherein determining the HARQ-ACK information required to be transmitted by the second serving cell according to the ACKs/NACKs corresponding to the X+Q DL subframes comprises that:
  HARQ-ACK information corresponding to the ACKs/NACKs of the Q DL subframes is determined as the last Q pieces of the HARQ-ACK information required to be transmitted by the second serving cell.

9. The method according to claim 1, wherein the first serving cell is a secondary serving cell, or an FDD serving cell, or a scheduled serving cell; and
  the second serving cell is a primary serving cell, or a TDD serving cell, or a scheduling serving cell.

10. A device for response information transmission, comprising:
  a processor; and
  a memory for storing instructions executable by the processor, the processor being configured to execute the instructions to
  when a Time Division Duplex (TDD) serving cell and a Frequency Division Duplex (FDD) serving cell perform Carrier Aggregation (CA) and it is configured to use a Physical Uplink Control Channel (PUCCH) format 1b with channel selection for transmission of Hybrid Automatic Repeat Request-ACK (HARQ-ACK) information, determine HARQ-ACK information to be transmitted on an Uplink (UL) subframe by a first serving cell and a second serving cell:
  selecting Q DL subframes from the M DL subframes $\{n-k^0, n-k_1, \ldots, n-k_{M-1}\}$ of the first serving cell, corresponding to the UL subframe, according to one or more of predefined rules B, selecting N DL subframes from M−Q DL subframes of the first serving cell according to one or more of predefined rules A if M−Q>4, bundling ACKs/NACKs corresponding to the N selected DL subframes, and determining the HARQ-ACK information required to be transmitted by the first serving cell according to the bundled ACKs/NACKs and ACKs/NACKs corresponding to the remaining DL subframes, and if M−Q≤4, determining the HARQ-ACK information required to be transmitted by the first serving cell according to ACKs/NACKs corresponding to M−Q DL subframes; if X+Q >4, selecting N DL subframes from X+Q DL subframes according to one or more of predefined rules A, bundling ACKs/NACKs corresponding to the N selected DL subframes, and determining the HARQ-ACK information required to be transmitted by the second serving cell on the UL subframe according to the bundled ACKs/NACKs and the remaining DL subframes, and if X+Q≤4, determining the HARQ-ACK information required to be transmitted by the second serving cell according to ACKs/NACKs corresponding to the X+Q DL subframes,
  wherein M is a positive integer more than 4; and
  transmit the determined HARQ-ACK information via a PUCCH or a Physical Uplink Shared Channel (PUCCH),
  wherein a value of N is determined to make the total number of the bundled ACKs/NACKs and the ACKs/NACKs corresponding to the remaining DL subframes equal to the number of the ACKs/NACKs corresponding to the DL subframes of the second serving cell, or, the value of N is determined to make the total number of the bundled ACKs/NACKs and the ACKs/NACKs corresponding to the remaining DL subframes equal to 4.

11. The device according to claim 10, wherein the predefined rules A comprise at least one of the following rules:
Rule 1: selecting the N DL subframes according to feedback delays;
Rule 2: selecting the N DL subframes with at least one DL subframe wherein the second serving cell corresponding to the at least one DL subframe is a UL subframe;
Rule 3: selecting the N DL subframes with one or more DL subframes wherein the second serving cell corresponding to the one or more DL subframes is a DL subframe;
Rule 4: indicating the N DL subframes through signalling;
Rule 5: predetermining the N DL subframes; and
Rule 6: selecting the N DL subframes according to Downlink Assignment Indexes (DAIs).

12. The device according to claim 11, wherein the processor is further configured to execute the instructions to select the N DL subframes according to the feedback delays by:
selecting N DL subframes with the most approximate feedback delays; or,
selecting N DL subframes with the smallest feedback delays; or,
selecting N DL subframes with the largest feedback delays; or,
selecting N DL subframes with the most approximate feedback delays and the smallest feedback delays; or,
selecting N DL subframes with the most approximate feedback delays and the largest feedback delays;
wherein the rule of selecting the N DL subframes according to the DAIs comprises:
selecting N DL subframes with relatively larger DAI values; or,
selecting N DL subframes with relatively smaller DAI values.

13. The device according to claim 10, wherein determining the HARQ-ACK information required to be transmitted by the serving cell according to the bundled ACKs/NACKs and the ACKs/NACKs corresponding to the remaining DL subframes comprises that:
HARQ-ACK information corresponding to the bundled ACKs/NACKs is the last one of the HARQ-ACK information required to be transmitted by the serving cell; or,
when the second serving cell having the same subframe indexes with the N DL subframes is the DL subframes, a position of the HARQ-ACK information corresponding to the bundled ACKs/NACKs in the HARQ-ACK information required to be transmitted by the first serving cell is the same as a position of HARQ-ACK information corresponding to the DL subframes of the second serving cell in the HARQ-ACK information required to be transmitted by the second serving cell.

14. The device according to claim 10, wherein the predefined rules B comprise at least one of the following rules:
Rule 1: selecting the Q DL subframes according to feedback delays;
Rule 2: selecting the Q DL subframes with at least one DL subframe wherein the second serving cell corresponding to the at least one DL subframe is a UL subframe;
Rule 3: indicating the Q DL subframes through signalling;
Rule 4: predetermining the Q DL subframes; and
Rule 5: selecting the Q DL subframes according to DAIs.

15. The device according to claim 14, wherein the rule of selecting the Q DL subframes according to the feedback delays comprises:
selecting Q DL subframes with the most approximate feedback delays; or,
selecting Q DL subframes with the smallest feedback delays; or,
selecting Q DL subframes with the largest feedback delays; or,
selecting Q DL subframes with the most approximate feedback delays and the smallest feedback delays; or,
selecting Q DL subframes with the most approximate feedback delays and the largest feedback delays; and
wherein the rule of selecting the Q DL subframes according to the DAIs comprises:
selecting Q DL subframes with relatively larger DAI values; or,
selecting Q DL subframes with relatively smaller DAI values.

16. The device according to claim 10, the processor is further configured to execute the instructions to,
determine HARQ-ACK information corresponding to the ACKs/NACKs from the Q DL subframes as the last Q pieces of the HARQ-ACK information required to be transmitted by the second serving cell.

17. The device according to claim 10, wherein the first serving cell is a secondary serving cell, or an FDD serving cell, or a scheduled serving cell; and
the second serving cell is a primary serving cell, or a TDD serving cell, or a scheduling serving cell.

18. A non-transitory computer-readable storage medium, having a computer program stored, the computer program being configured to execute a method for response information transmission, wherein the method comprises:
when a Time Division Duplex (TDD) serving cell and a Frequency Division Duplex (FDD) serving cell perform Carrier Aggregation (CA) and it is configured to use a Physical Uplink Control Channel (PUCCH) format 1b with channel selection for transmission of Hybrid Automatic Repeat Request-Acknowledgement (HARQ-ACK) information, determining HARQ-ACK information to be transmitted on an Uplink (UL) subframe by a first serving cell and a second serving cell, and transmitting the determined HARQ-ACK information via a PUCCH or a Physical Uplink Shared Channel (PUSCH):
selecting Q DL subframes from the M DL subframes $\{n-k_0, n-k_1, \ldots, n-k_{M-1}\}$ of the first serving cell, corresponding to the UL subframe, according to one or more of predefined rules B, selecting N DL subframes from M−Q DL subframes of the first serving cell according to one or more of predefined rules A if M−Q>4, bundling ACKs/NACKs corresponding to the N selected DL subframes, and determining the HARQ-ACK information required to be transmitted by the first serving cell according to the bundled ACKs/NACKs and ACKs/NACKs corresponding to the remaining DL subframes, and if M−Q≤4, determining the HARQ-ACK information required to be transmitted by the first serving cell according to ACKs/NACKs corresponding to M−Q DL subframes; if X+Q>4, selecting N DL subframes from X+Q DL subframes according to one or more of predefined rules A, bundling ACKs/NACKs corresponding to the N selected DL subframes, and determining the HARQ-ACK information required to be transmitted by the second serving cell on the UL subframe according to the bundled ACKs/NACKs and the ACKs/NACKs corresponding to the remaining DL subframes, and if X+Q≤4, determining the HARQ-ACK information required to be transmitted by the second serving cell according to ACKs/NACKs corresponding to the X+Q DL subframes, wherein M is a positive integer more than 4, wherein a value of N is determined to make the total number of the bundled ACKs/NACKs and the ACKs/NACKs corresponding to the remaining DL subframes equal to the number of the ACKs/NACKs corresponding to the DL subframes of the second serving cell; or, the value of N is determined to make the total number of the bundled ACKs/NACKs and the ACKs/NACKs corresponding to the remaining DL subframes equal to 4.

* * * * *